:::

United States Patent
Shi et al.

(10) Patent No.: US 11,489,190 B2
(45) Date of Patent: Nov. 1, 2022

(54) NON-AQUEOUS ELECTROLYTE FOR LITHIUM ION BATTERY AND LITHIUM ION BATTERY

(71) Applicant: SHENZHEN CAPCHEM TECHNOLOGY CO., LTD., Guangdong (CN)

(72) Inventors: Qiao Shi, Guangdong (CN); Muchong Lin, Guangdong (CN); Shiguang Hu, Guangdong (CN); Ruixing Liu, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 183 days.

(21) Appl. No.: 16/490,900

(22) PCT Filed: Jun. 22, 2017

(86) PCT No.: PCT/CN2017/089535
§ 371 (c)(1),
(2) Date: Sep. 4, 2019

(87) PCT Pub. No.: WO2018/196142
PCT Pub. Date: Nov. 1, 2018

(65) Prior Publication Data
US 2020/0020973 A1    Jan. 16, 2020

(30) Foreign Application Priority Data
Apr. 28, 2017 (CN) .......................... 201710297456.2

(51) Int. Cl.
*H01M 10/0525* (2010.01)
*H01M 10/0566* (2010.01)

(52) U.S. Cl.
CPC ... *H01M 10/0525* (2013.01); *H01M 10/0566* (2013.01); *H01M 2220/20* (2013.01); *H01M 2220/30* (2013.01); *H01M 2300/0025* (2013.01)

(58) Field of Classification Search
CPC .................. H01M 10/0525; H01M 2300/0025
See application file for complete search history.

(56) References Cited

U.S. PATENT DOCUMENTS

| | | |
|---|---|---|
| 3,663,569 A | 5/1972 | Lew |
| 6,174,629 B1 | 1/2001 | Gan et al. |
| 9,236,634 B2 | 1/2016 | Cheng et al. |
| 2019/0081354 A1* | 3/2019 | Zheng ............... H01M 10/0567 |

FOREIGN PATENT DOCUMENTS

| | | |
|---|---|---|
| CN | 1495959 A | 5/2004 |
| CN | 102195076 A | 9/2011 |
| CN | 103151559 A | 6/2013 |
| CN | 103354962 A | 10/2013 |
| CN | 103441304 A | 12/2013 |
| CN | 103460496 A | 12/2013 |
| CN | 103594729 A | 2/2014 |
| CN | 104300174 A | 1/2015 |
| CN | 105051965 A | 11/2015 |
| CN | 105161763 A | 12/2015 |
| CN | 105580189 A | 5/2016 |
| CN | 105633461 A | 6/2016 |
| CN | 105830270 A | 8/2016 |
| CN | 106058317 A | 10/2016 |
| CN | 106252639 A | 12/2016 |

(Continued)

OTHER PUBLICATIONS

International Search Report of PCT Patent Application No. PCT/CN2017/089535 dated Jan. 17, 2018.

(Continued)

*Primary Examiner* — Ula C Ruddock
*Assistant Examiner* — Thomas H. Parsons

(57) ABSTRACT

In order to solve the problem of insufficient cycle performance and high-temperature storage performance of the existing non-aqueous electrolyte for lithium ion battery containing maleic anhydride copolymer, the application provides a non-aqueous electrolyte for lithium ion battery. The non-aqueous electrolyte for lithium ion battery comprises a compound A represented by formula I and a compound B represented by formula II,

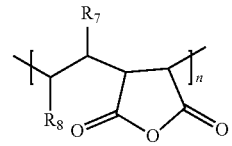

Formula I

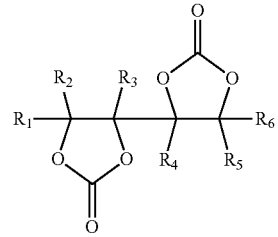

Formula II In formula I, $R_7$ and $R_8$ are independently selected from one of hydrogen atom, halogen atom, —O—$R_9$ or aryl, wherein n is a positive integer and $R_9$ is a C1-C4 alkyl group; In formula II, $R_1$, $R_2$, $R_3$, $R_4$, $R_5$ and $R_6$ are each independently selected from one of hydrogen atom, fluorine atom and C1-C5 group. The non-aqueous electrolyte for lithium ion battery provided by the invention can improve the cycle stability and high-temperature storage performance of the battery through the effections of compound A and compound B.

9 Claims, No Drawings

(56) References Cited

FOREIGN PATENT DOCUMENTS

| CN | 106328996 A | | 1/2017 |
|---|---|---|---|
| CN | 106410272 A | | 2/2017 |
| GB | 1147540 A | | 4/1969 |
| JP | 2000260467 A | | 9/2000 |
| JP | 2006219406 A | | 8/2006 |
| JP | 2014182951 A | | 9/2014 |
| JP | 2014525667 A | | 9/2014 |
| JP | 2015092476 | * | 5/2015 |
| JP | 2015092476 A | | 5/2015 |
| WO | WO2014144056 | * | 9/2014 |
| WO | 2016025589 A1 | | 2/2016 |
| WO | 2016151983 A1 | | 9/2016 |

OTHER PUBLICATIONS

Libo Hu et al., Fluorinated electrolytes for 5-V Li-ion chemistry: Dramatic enhancement of LiNi0.5Mn1.5O4/graphite cell performance by a lithium reservoir, Electrochemistry Communications, Apr. 2014, vol. 44, pp. 34-37.

* cited by examiner

NON-AQUEOUS ELECTROLYTE FOR LITHIUM ION BATTERY AND LITHIUM ION BATTERY

TECHNICAL FIELD

The invention relates to the field of lithium ion batteries, more particularly, to a non-aqueous electrolyte for lithium ion battery and lithium ion battery.

BACKGROUND

Lithium ion battery is a secondary battery that works by the movement of lithium ions between positive and negative electrodes. Lithium-ion battery have the advantages of high specific energy, high specific power, long cycle life and so on. At present, they are mainly used in the fields of 3C digital consumer electronics, new energy-powered automobiles and energy storage. With the continuous improvement of the requirements for the endurance mileage of new energy vehicles and the miniaturization of digital consumer electronics products, high energy density has become the main development trend of lithium ion batteries, and increasing the working voltage of lithium ion batteries has become an effective way to improve the energy density of batteries. The increase of the working voltage of lithium ion battery can improve the energy density of the battery, but at the same time, the increase of the working voltage would deteriorate the performances of the battery. Because, on the one hand, the crystal structure of the positive electrode of the battery is unstable under high voltage. In the process of charging and discharging, the crystal structure of the positive electrode of the battery will collapse, resulting in deterioration of performance. On the other hand, under high voltage, the surface of the positive electrode is in a high oxidation state with high activity, which is easy to catalyze the oxidative decomposition of the electrolyte, and the decomposition products of the electrolyte could easily deposit on the surface of the positive electrode, blocking the diffusion channel of lithium ions, thus deteriorating the battery performances.

Electrolyte is the key factor that affects the integral performance of the battery, especially, additives in electrolyte are particularly important for the battery performances. Therefore, to give full play to the performance of lithium ion power battery using a nickel-cobalt-manganese ternary material as positive electrode, the appropriate selection of electrolyte is the key. U.S. Pat. No. 9,236,634B2 discloses an electrolyte for lithium ion battery, comprising an additive maleic anhydride copolymer, which can be used as an additive to improve the cycle performance of lithium ion battery at a high voltage of 4.2V~4.9V. However, a large number of studies have found that the use of additive maleic anhydride copolymer will accelerate the attenuation in the subsequent cycle of the battery, and the addition of such additives in battery will cause gas expansion to the battery during long-term high-temperature storage, resulting in insufficient high-temperature storage performance.

SUMMARY

The invention aims to provide a non-aqueous electrolyte for lithium ion battery with better cycle performance and high-temperature storage performance, and aims to solve the problem of insufficient cycle performance and high-temperature storage performance of the existing non-aqueous electrolyte for lithium ion battery containing maleic anhydride copolymer.

The non-aqueous electrolyte for lithium ion battery provided by the present application, comprises a compound A represented by formula I and a compound B represented by formula II,

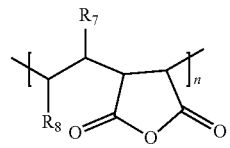

Formula I

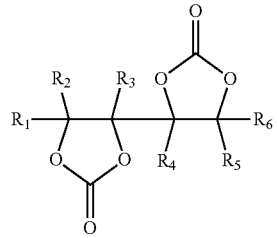

Formula II

In formula I, $R_7$ and $R_8$ are independently selected from one of hydrogen atom, halogen atom, —O—$R_9$ or aryl, wherein n is a positive integer and $R_9$ is a C1-C4 alkyl group;

In formula II, $R_1$, $R_2$, $R_3$, $R_4$, $R_5$ and $R_6$ are each independently selected from one of hydrogen atom, halogen atom and C1-C5 group.

In formula II, the C1-C5 group is selected from a hydrocarbon group, halogenated hydrocarbon group, oxygen-containing hydrocarbon group, silicon-containing hydrocarbon group, and cyano-substituted hydrocarbon group.

In formula II, $R_1$, $R_2$, $R_3$, $R_4$, $R_5$ and $R_6$ are each independently selected from a hydrogen atom, fluorine atom, methyl group, ethyl group, methoxyl group, ethyoxyl group, triethylsiloxy group, cyano group and trifluoromethyl group.

Preferably, the compound B comprises one or more of compounds 1-9 represented by the following structural formulae,

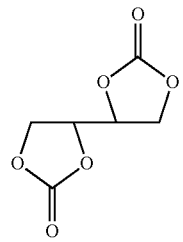

Compound 1

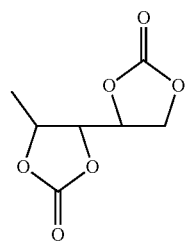

Compound 2

-continued

Compound 3
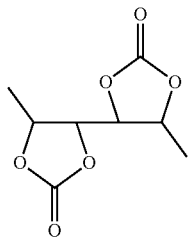

Compound 4
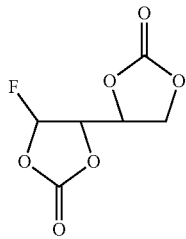

Compound 5
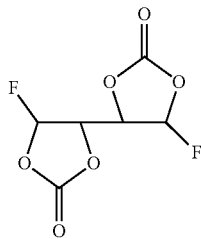

Compound 6
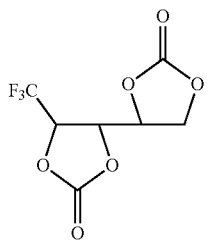

Compound 7
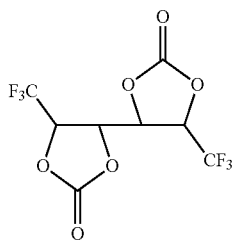

Compound 8
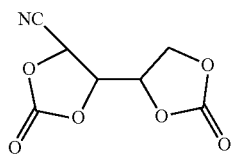

Compound 9
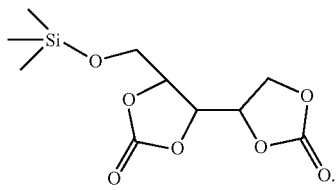

Preferably, the percentage mass content of the compound B is 0.1-5% based on the total mass of the non-aqueous electrolyte for lithium ion battery being 100%.

Preferably, the compound A comprises one or more of compounds 10-13 represented by the following structural formulae,

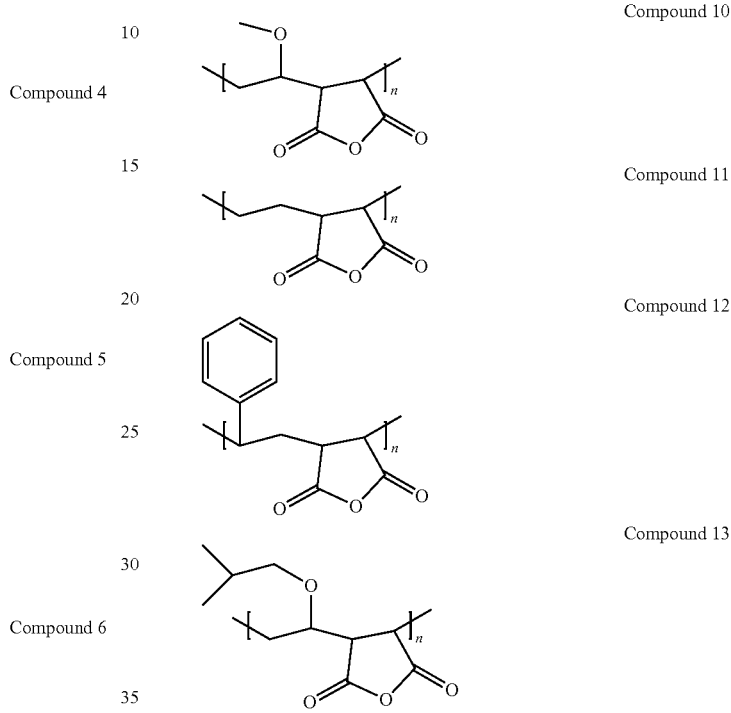

In the compounds 10, 11, 12 and 13, n is a positive integer.

Preferably, the percentage mass content of the compound A is 0.1-5% based on the total mass of the non-aqueous electrolyte for lithium ion battery being 100%.

Preferably, the lithium ion non-aqueous electrolyte further comprises at least one of unsaturated cyclic carbonate compounds, fluorine-substituted cyclic carbonate compounds, and sultone compounds.

Preferably, the unsaturated cyclic carbonate compound includes at least one of vinylene carbonate and vinyl ethylene carbonate. The fluorine-substituted cyclic carbonate compound includes fluoroethylene carbonate. The sultone compound is selected from at least one of 1,3-propane sultone, 1,4-butane sultone, and 1,3-propene sultone.

Preferably, the non-aqueous electrolyte for lithium ion battery comprises a lithium salt selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$ and $LiN(SO_2F)_2$.

And, a lithium ion battery, comprises a positive electrode, a negative electrode, a separator interposed between the positive electrode and the negative electrode, and an electrolyte, wherein the electrolyte is the non-aqueous electrolyte for lithium ion battery.

Preferably, the positive electrode comprises a positive electrode active material, and the positive electrode active material is at least one of $LiNi_xCo_yMn_zL_{(1-x-y-z)}O_2$, $LiCo_{x'}L_{(1-x')}O_2$, $LiNi_{x''}L'_{y'}Mn_{(2-x''-y')}O_4$ and $Li_zMPO_4$, wherein, L is at least one of Al, Sr, Mg, Ti, Ca, Zr, Zn, Si or Fe, $0 \leq x \leq 1$, $0 \leq y \leq 1$, $0 \leq z \leq 1$, $0 < x+y+z \leq 1$, $0 < x' \leq 1$, $0.3 \leq x'' \leq 0.6$, $0.03 \leq y' \leq 0.2$, L' is at least one of Co, Al, Sr, Mg, Ti, Ca, Zr, Zn, Si and Fe; $0.5 \leq z' \leq 1$, M is at least one of Fe, Mn and Co.

The non-aqueous electrolyte for lithium ion battery of the invention contains both compound A and compound B, which can effectively improve the high-temperature storage performance and cycle stability of the battery, so that the lithium ion battery containing the non-aqueous electrolyte has better cycle performance and high-temperature storage performance.

The lithium ion battery provided by the application contains the above-mentioned non-aqueous electrolyte, which enables the lithium ion battery to have both better cycle performance and high-temperature storage performance.

DETAILED DESCRIPTION OF DISCLOSED EMBODIMENTS

In order to make the technical problems to be solved, technical solutions and beneficial effects more apparent and clearer, the present application will be described in further detail below with reference to embodiments. It should be understood that the specific embodiments described herein are only for the purpose of explaining the present invention and are not intended to limit the present invention.

The non-aqueous electrolyte for lithium ion battery provided by the present application, comprises a compound A represented by formula I and a compound B represented by formula II,

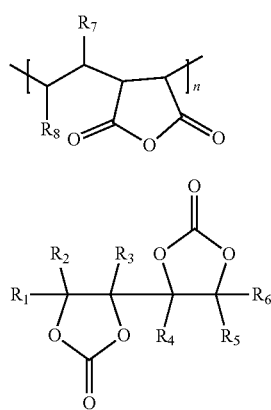

Formula I

Formula II

In formula I, $R_7$ and $R_8$ are independently selected from one of hydrogen atom, halogen atom, —O—$R_9$ or aryl, wherein n is a positive integer and $R_9$ is a C1-C4 alkyl group;

In formula II, $R_1$, $R_2$, $R_3$, $R_4$, $R_5$ and $R_6$ are each independently selected from one of hydrogen atom, halogen atom and C1-C5 group.

In the embodiments of the invention, C1-C4 indicates that the number of carbon atoms is 1-4, similarly, C1-C5 indicates that the number of carbon atoms is 1-5.

Specifically preferably, the compound A comprises one or more of compounds 10-13 represented by the following structural formulae,

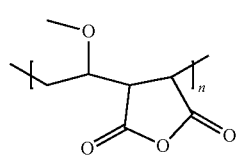

Compound 10

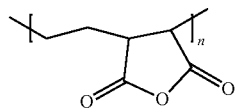

Compound 11

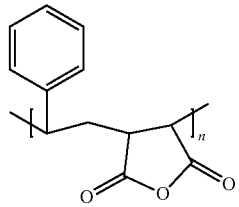

Compound 12

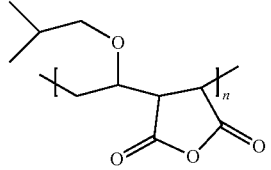

Compound 13

In the compounds 10, 11, 12 and 13, n is a positive integer.

The preferred compound 10, compound 11, compound 12 and compound 13 not only have good cycle performance, but also can have synergistic effect with the compound B of the embodiments of the invention, to improve the high-temperature storage performance and cycle stability of the battery.

Preferably, based on the total mass of the non-aqueous electrolyte for lithium ion battery being 100%, the percentage mass content of the compound A is 0.1-5%, which can obviously reduce the reaction between the positive electrode material and the electrolyte under high voltage and improve the cycle performance of the battery. When the percentage mass content of the compound A is less than 0.1%, the film forming effect of the compound A on the positive electrode is weak, the circulation cannot be improved as expected. When the percentage mass content of the compound A is more than 5%, the viscosity of the electrolyte is obviously increased, the permeability of the electrolyte on the electrode is reduced, the capacity of the battery is thereby decreased, meanwhile, the impedance of the battery is increased, and the low-temperature and power performances of the battery are deteriorated. More preferably, the percentage mass content of the compound A is 0.5-3% based on the total mass of the non-aqueous electrolyte for lithium ion battery being 100%.

The non-aqueous electrolyte for lithium ion battery provided by the embodiments of the invention contains a compound A (maleic anhydride copolymer) represented by structural formula I, and the compound A has an obvious film forming effect on the positive electrode during the formation and charging process of the battery. Specifically, it can generate a dense passivation film uniformly covering the surface of the positive electrode material, and the passivation film can effectively reduce side reactions between the electrode material and electrolyte under high voltage in subsequent charging and discharging processes, thereby improving the cycle performance of the lithium ion battery under high voltage. However, the compound A has no obvious film forming effect on the surface of the negative electrode material and lacks effective protection for the negative electrode, which often leads to the situation that the capacity attenuation of the battery is accelerated in the later period and the problem that the high-temperature storage expansion is large.

In the embodiments of the invention, on the basis of the compound A represented by structural formula I above, the compound B represented by structural formula II was added to the non-aqueous electrolyte for lithium ion battery. The compound B has an obvious film forming effect on negative electrode, which can improve the stability of the negative electrode in the circulation process, and obviously improve the cycle performance of the battery. And the inventor have repeatedly studied and found that in the non-aqueous electrolyte for lithium ion battery of the embodiments of the invention, the compound B and the compound A were combined to form an effective passivation film on the positive electrode and the negative electrode of the battery at the same time, the side reaction of the electrolyte between the positive electrode and the negative electrode was reduced, the stability in the circulation process was increased, and the high-temperature storage performance of the lithium ion battery was obviously improved.

In formula II, $R_1$, $R_2$, $R_3$, $R_4$, $R_5$ and $R_6$ are each independently selected from one of hydrogen atom, halogen atom and C1-C5 group.

In formula II, the C1-C5 group is selected from a hydrocarbon group, halogenated hydrocarbon group, oxygen-containing hydrocarbon group, silicon-containing hydrocarbon group, and cyano-substituted hydrocarbon group.

In formula II, $R_1$, $R_2$, $R_3$, $R_4$, $R_5$ and $R_6$ are each independently selected from a hydrogen atom, fluorine atom, methyl group, ethyl group, methoxyl group, ethyoxyl group, triethylsiloxy group, cyano group or trifluoromethyl group.

Specifically preferably, the compound B comprises one or more of compounds 1-9 represented by the following structural formulae, Compound 1

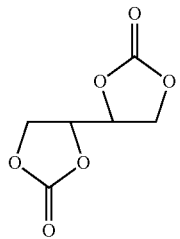

Compound 2

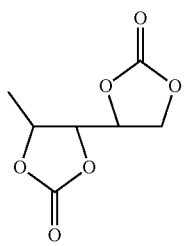

Compound 3

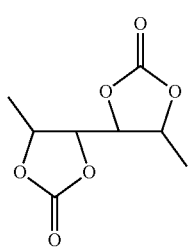

Compound 4

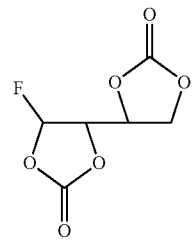

Compound 5

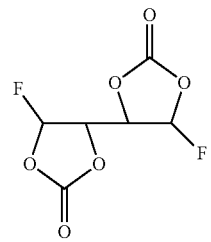

Compound 6

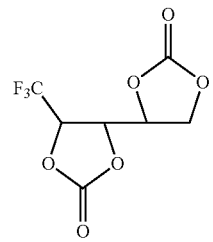

Compound 7

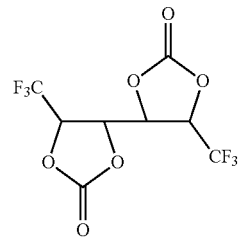

Compound 8

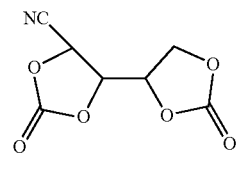

Compound 9

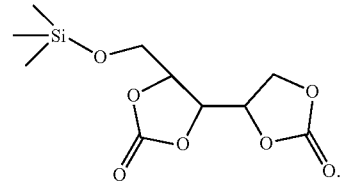

The preferred compound B can better work with the compound A, giving the battery better integral performance (cycle performance, high-temperature storage performance).

The synthesis method of the compound B represented by formula I is conventional, for example, the compound B can be prepared by ester exchange reaction between polyol (such as erythritol, xylitol, etc.) and carbonate (such as dimethyl carbonate, diethyl carbonate, vinyl carbonate, etc.) in the presence of basic catalyst. An example of the synthetic route is as follows:

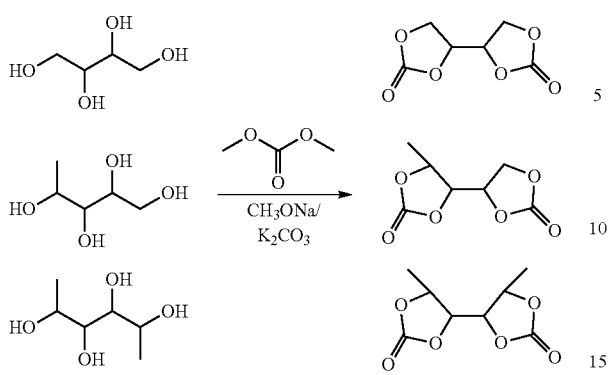

The fluorine-containing compound in compound B is prepared by: fluorinating the corresponding carbonate and mixture $F_2/N_2$, and then recrystallizing or purifying by column chromatography. An example of the synthetic route is as follows:

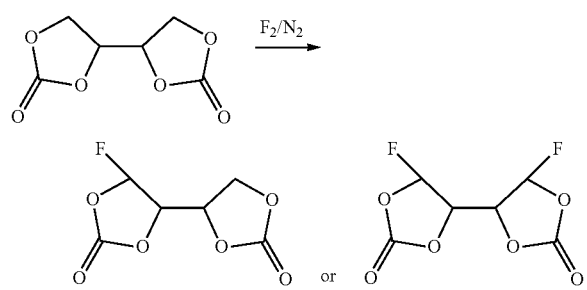

The cyano group-containing compound in compound B is prepared by: the chlorination reaction of the corresponding carbonate and sulfonyl chloride, then reacting with NaCN or KCN, and then recrystallizing or purifying by column chromatography. An example of the synthetic route is as follows:

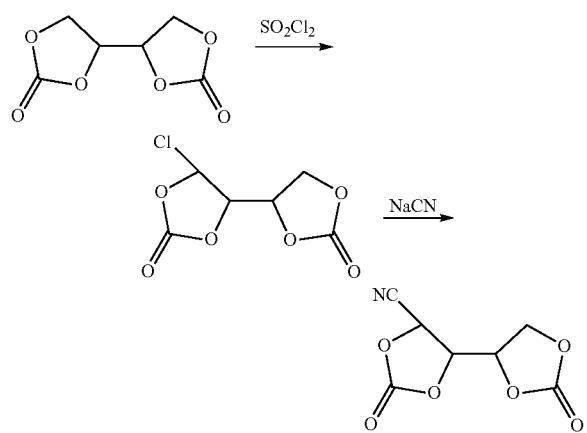

The trimethylsilanolate-containing compound in the compound B is prepared by: the substitution reaction of the corresponding hydroxy carbonate and silazane, thenr ecrystallizing or purifying by column chromatography. An example of the synthetic route is as follows:

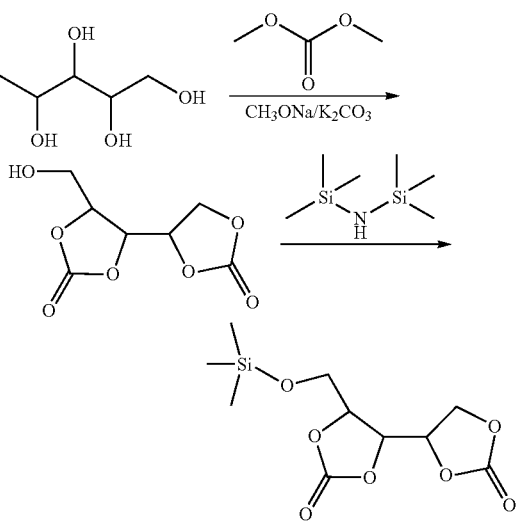

Preferably, based on the total mass of the non-aqueous electrolyte for lithium ion battery being 100%, the percentage mass content of the compound B is 0.1-5%, which can obviously improve the cycle performance of the battery. When the percentage mass content of the compound B is less than 0.1%, the film forming effect of the compound B on the negative electrode is weak, the circulation cannot be improved as expected; However, when the percentage mass content of the compound B is more than 5%, the battery impedance will be increased, and the battery performances will be deteriorated. More preferably, the percentage mass content of the compound B is 0.5-2% based on the total mass of the non-aqueous electrolyte for lithium ion battery being 100%.

The non-aqueous electrolyte for lithium ion battery of the invention contains both compound A and compound B, which can effectively improve the high-temperature storage performance and cycle stability of the battery, so that the lithium ion battery containing the non-aqueous electrolyte has better cycle performance and high-temperature storage performance.

It is understood that if the non-aqueous electrolyte for lithium ion battery contains one of the above substances, the content is the content of the one substance; If the non-aqueous electrolyte for lithium ion battery contains a plurality of the above substances, the content is the sum of the contents of the plurality of substances.

Based on the above embodiments, it is preferred that the lithium ion non-aqueous electrolyte further comprises at least one of unsaturated cyclic carbonate compounds, fluorine-substituted cyclic carbonate compounds, and sultone compounds.

Preferably, the unsaturated cyclic carbonate compound includes at least one of vinylene carbonate (VC) and vinyl ethylene carbonate (VEC). The fluorine-substituted cyclic carbonate compound includes fluoroethylene carbonate (FEC). The sultone compound is selected from at least one of 1,3-propane sultone, 1,4-butane sultone, and 1,3-propene sultone.

The content of unsaturated cyclic carbonate compound is 0.1-5% based on the total mass of the non-aqueous electrolyte for lithium ion battery being 100%.

The content of fluorine-substituted cyclic carbonate compound is 0.1-30% based on the total mass of the non-aqueous electrolyte for lithium ion battery being 100%.

The percentage mass content of sultone compound is 0.1-5% based on the total mass of the non-aqueous electrolyte for lithium ion battery being 100%.

As is known to those skilled in the art, the main components in the non-aqueous electrolyte for lithium ion battery are non-aqueous organic solvents, lithium salts and additives. Wherein, the specific non-aqueous organic solvent can be conventional substance, for example, the non-aqueous organic solvent is selected from at least one of ethylene carbonate, propylene carbonate, butylene carbonate, dimethyl carbonate, diethyl carbonate, methyl ethyl carbonate and methyl propyl carbonate.

Preferably, the lithium salt is selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$ and $LiN(SO_2F)_2$. The lithium salt content in the non-aqueous electrolyte for lithium ion battery is 0.1-15%.

In the present application, compound A and compound B are additives. The content of non-aqueous organic solvent and lithium salt is conventional, and the content can be adjusted conventionally after the content of the additive containing compound A and compound B is determined.

And, the embodiment of the invention also provides a lithium ion battery, comprising a positive electrode, a negative electrode, a separator interposed between the positive electrode and the negative electrode, and an electrolyte, wherein the electrolyte is the non-aqueous electrolyte for lithium ion battery.

Preferably, the positive electrode comprises a positive electrode active material, and the positive electrode active material is at least one of $LiNi_xCo_yMn_zL_{(1-x-y-z)}O_2$, $LiCo_{x'}L_{(1-x')}O_2$, $LiNi_{x''}L'_{y'}Mn_{(2-x''-y')}O_4$, $Li_z$ and $MPO_4$, wherein, L is at least one of Al, Sr, Mg, Ti, Ca, Zr, Zn, Si or Fe, $0 \leq x \leq 1$, $0 \leq y \leq 1$, $0 \leq z \leq 1$, $0 < x+y+z \leq 1$, $0 < x' \leq 1$, $0.3 \leq x'' \leq 0.6$, $0.01 \leq y' \leq 0.2$, L' is at least one of Co, Al, Sr, Mg, Ti, Ca, Zr, Zn, Si and Fe; $0.5 \leq z' \leq 1$, M is at least one of Fe, Mn and Co.

Preferably, the charging cutoff voltage of the lithium ion battery is ≥4.3V.

In the embodiment of the present invention, the negative electrode and the separator are not specifically limited, they can be the conventional ones in the art.

The lithium ion battery provided by the application contains the above-mentioned non-aqueous electrolyte, which enables the lithium ion battery to have both better cycle performance and high-temperature storage performance.

The following description will be made with reference to specific embodiments in Table 1 and Table 2.

The following description will be made with reference to specific embodiments in Table 1:

Embodiment 1

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 1, based on the total weight of the non-aqueous electrolyte taken as 100% by weight.

Embodiment 2

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 2, based on the total weight of the non-aqueous electrolyte taken as 100% by weight.

Embodiment 3

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 3, based on the total weight of the non-aqueous electrolyte taken as 100% by weight.

Embodiment 4

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 4, based on the total weight of the non-aqueous electrolyte taken as 100% by weight.

Embodiment 5

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 5, based on the total weight of the non-aqueous electrolyte taken as 100% by weight.

Embodiment 6

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 6, based on the total weight of the non-aqueous electrolyte taken as 100% by weight.

Embodiment 7

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 7, based on the total weight of the non-aqueous electrolyte taken as 100% by weight.

Embodiment 8

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 8, based on the total weight of the non-aqueous electrolyte taken as 100% by weight.

Embodiment 9

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 9, based on the total weight of the non-aqueous electrolyte taken as 100% by weight.

Embodiment 10

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 10, based on the total weight of the non-aqueous electrolyte taken as 100% by weight.

Embodiment 11

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 11, based on the total weight of the non-aqueous electrolyte taken as 100% by weight.

Embodiment 12

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 12, based on the total weight of the non-aqueous electrolyte taken as 100% by weight.

Embodiment 13

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 13, based on the total weight of the non-aqueous electrolyte taken as 100% by weight.

Embodiment 14

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 14, based on the total weight of the non-aqueous electrolyte taken as 100% by weight.

Embodiment 15

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 15, based on the total weight of the non-aqueous electrolyte taken as 100% by weight.

Comparative Example 1

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 1, based on the total weight of the non-aqueous electrolyte taken as 100% by weight.

Comparative Example 2

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 2, based on the total weight of the non-aqueous electrolyte taken as 100% by weight.

Comparative Example 3

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 3, based on the total weight of the non-aqueous electrolyte taken as 100% by weight.

The Embodiments 1-15 and the LiNi$_{0.5}$Co$_{0.2}$Mn$_{0.3}$O$_2$/artificial graphite batteries (charge and discharge voltage range: 3~4.4V) of Comparative Examples 1-3 of the present invention were tested for performance, and the test parameters and test methods are as follows:

(1) High-temperature cycle performance is demonstrated by testing the capacity retention rate after 500th cycles at 1 C rate, 45° C. The specific method is as follows: at 45° C., the formed battery was charged with 1 C constant current/constant voltage to an operating voltage, the cutoff current was 0.01 C, and then discharged to 3.0V with 1 C constant current. After such charging/discharging for 500 cycles, the capacity retention after the 500th cycle was calculated to evaluate its high-temperature cycle performance.

The calculation formula of the 500th cycle capacity retention rate at 45° C. 1 C is as follows:

The 500th cycle capacity retention rate (%)=(the 500th cycle discharge capacity/the first cycle discharge capacity)*100%;

(2) Room-temperature cycle performance is demonstrated by testing the capacity retention rate after 500th cycles at 1 C rate, 25° C. The specific method is as follows: at 25° C., the formed battery was charged with 1 C constant current/ constant voltage to an operating voltage, the cutoff current was 0.01 C, and then discharged to 3.0V with 1 C constant current. After such charging/discharging for 500 cycles, the capacity retention after the 500th cycle was calculated to evaluate its room-temperature cycle performance.

The calculation formula of the 500th cycle capacity retention rate at room temperature 1 C is as follows:

The 500th cycle capacity retention rate (%)=(the 500th cycle discharge capacity/the first cycle discharge capacity)*100%;

(3) Test method for capacity retention rate, capacity recovery rate and thickness expansion rate after 30 days of storage at 60° C.: the formed battery was charged to an operating voltage at room temperature with 1 C constant current/constant voltage, the cutoff current was 0.01 C, then discharged to 3.0V with 1 C constant current, the initial discharge capacity of the battery was measured, then charged to the operating voltage with 1 C constant current/constant voltage, the cutoff current was 0.01 C, and the initial thickness of the battery was measured. Then the battery was stored at 60° C. for 30 days, measured the thickness of the battery, discharged it to 3.0V with 1 C constant current, measured the capacity retention of the battery, then charged it to the operating voltage with 1 C constant current/constant voltage, the cutoff current was 0.01 C, then discharged it to 3.0V with 1 C constant current, then measured the recovery capacity. The calculation formulas for capacity retention rate and capacity recovery rate are as follows:

Battery capacity retention rate (%)=(retention capacity/initial capacity)*100%;

Battery capacity recovery rate (%)=(recovery capacity/initial capacity)*100%;

Battery thickness expansion rate (%)=(thickness after 30 days−initial thickness)/initial thickness*100%.

The test results of Embodiments 1-15 and Comparative Examples 1-3 are shown in Table 1 below.

Referring to Table 1, Embodiments 1-10, 13, 14 and Comparative Example 1 are compared. Both compound A and compound B were added to the lithium ion non-aqueous electrolyte of Embodiments 1-10, 13 and 14, and only Compound A was added to the lithium ion non-aqueous electrolyte of Comparative Example 1. The results show that compared with the Comparative Example 1 containing only compound A, the cycle performance and high-temperature storage performance of the battery made with the lithium ion non-aqueous electrolyte containing both compound A and compound B are obviously improved. It can be seen that the combined use of compound A and compound B can improve the cycle performance and high-temperature storage performance of the battery.

Comparing Embodiments 11, 12, 15 and Comparative Examples 2, 3. Compound A, compound B and other additives (VC, PS or LiFSI) were added to the lithium ion non-aqueous electrolyte of Embodiments 11, 12 and 15, and in Comparative Examples 2 and 3, in addition to Compound A, VC and PS were added, respectively. The results show that the combined use of compound A and other additives did not improve the cycle performance and high-temperature storage performance of the battery, instead, the cycle performance and high-temperature storage performance of the battery were reduced. While in the embodiments of the invention, the combined use of compound A, compound B and other additives (VC, PS or LiFSI) did not have influence on the cycle performance and high-temperature storage performance of the battery. It can be seen that the addition of the compound B can also improve the influence of the other additives on the battery cycle performance and high-temperature storage performance.

The following description will be made with reference to specific embodiments in Table 2:

Embodiment 16

A $LiNi_{0.8}Co_{0.5}Al_{0.05}O_2$/artificial graphite battery, comprises a positive electrode, a negative electrode, a separator interposed between the positive electrode and the negative

TABLE 1

| | Compound A | Compound B | Other | The 500th cycle capacity retention rate (%) at 25° C. 1 C | The 500th cycle capacity retention rate (%) at 45° C. 1 C | After 30 days of storage at 60° C. | | |
|---|---|---|---|---|---|---|---|---|
| | | | | | | Capacity retention rate (%) | Capacity recovery rate (%) | Thickness expansion rate (%) |
| Embodiment 1 | Compound 10: 2% | Compound 1: 1% | / | 92.15 | 84.46 | 97.13 | 98.45 | 11.88 |
| Embodiment 2 | Compound 10: 0.5% | Compound 1: 1% | / | 89.43 | 80.28 | 92.18 | 94.55 | 10.67 |
| Embodiment 3 | Compound 10: 1% | Compound 1: 1% | / | 90.00 | 80.94 | 92.57 | 94.89 | 10.82 |
| Embodiment 4 | Compound 10: 3% | Compound 1: 1% | / | 93.09 | 85.4 | 97.55 | 98.51 | 12.3 |
| Embodiment 5 | Compound 10: 2% | Compound 1: 0.5% | / | 91.58 | 82.31 | 93.25 | 95.68 | 12.89 |
| Embodiment 6 | Compound 10: 2% | Compound 1: 1.5% | / | 91.54 | 83.46 | 96.19 | 98.08 | 12.54 |
| Embodiment 7 | Compound 10: 2% | Compound 1: 2% | / | 91.45 | 82.56 | 95.21 | 97.58 | 12.6 |
| Embodiment 8 | Compound 10: 1% | Compound 1: 1% | / | 92.89 | 84.39 | 96.89 | 98.5 | 11.56 |
| Embodiment 9 | Compound 10: 1% | Compound 1: 1% | / | 90.50 | 83.67 | 97.81 | 98.61 | 12.44 |
| Embodiment 10 | Compound 10: 1% | Compound 1: 1% | / | 91.84 | 84.32 | 97.5 | 99.04 | 12.56 |
| Embodiment 11 | Compound 10: 2% | Compound 1: 1% | VC | 93.90 | 85 | 97 | 97.96 | 13.52 |
| Embodiment 12 | Compound 10: 2% | Compound 1: 1% | PS | 92.87 | 84.1 | 98 | 99.01 | 5 |
| Embodiment 13 | Compound 10: 2% | Compound 3: 1% | / | 91.67 | 83.46 | 91.13 | 95.45 | 12.08 |
| Embodiment 14 | Compound 10: 2% | Compound 5: 1% | / | 90.84 | 81.44 | 92.26 | 94.69 | 12.38 |
| Embodiment 15 | Compound 10: 2% | Compound 1: 1% | LiFSI | 93.15 | 84.87 | 98.83 | 98.64 | 11.91 |
| Comparative Example 1 | Compound 10: 2% | / | / | 80.97 | 65.6 | 85 | 89 | 15.22 |
| Comparative Example 2 | Compound 10: 2% | / | VC: 1% | 78.50 | 60.47 | 79.1 | 81.53 | 16.39 |
| Comparative Example 3 | Compound 10: 2% | / | FEC: 1% | 70.62 | 55.59 | 78.63 | 80.31 | 15.66 | electrode, and an electrolyte, wherein the electrolyte is a non-aqueous electrolyte and comprises the following components in percentage by mass as shown in Table 2 of embodiment 16, based on the total weight of the non-aqueous electrolyte taken as 100% by weight.

Embodiment 17

A $LiNi_{0.8}Co_{0.15}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 17, based on the total weight of the non-aqueous electrolyte taken as 100% by weight.

Embodiment 18

A $LiNi_{0.8}Co_{0.5}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 18, based on the total weight of the non-aqueous electrolyte taken as 100% by weight.

Embodiment 19

A $LiNi_{0.8}Co_{0.15}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 19, based on the total weight of the non-aqueous electrolyte taken as 100% by weight.

Embodiment 20

A $LiNi_{0.8}Co_{0.15}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 20, based on the total weight of the non-aqueous electrolyte taken as 100% by weight.

Embodiment 21

A $LiNi_{0.8}Co_{0.15}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 21, based on the total weight of the non-aqueous electrolyte taken as 100% by weight.

Embodiment 22

A $LiNi_{0.8}Co_{0.15}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 22, based on the total weight of the non-aqueous electrolyte taken as 100% by weight.

Embodiment 23

A $LiNi_{0.8}Co_{0.15}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 23, based on the total weight of the non-aqueous electrolyte taken as 100% by weight.

Embodiment 24

A $LiNi_{0.8}Co_{0.15}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 24, based on the total weight of the non-aqueous electrolyte taken as 100% by weight.

Comparative Example 4

A $LiNi_{0.8}Co_{0.15}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of Comparative Example 4, based on the total weight of the non-aqueous electrolyte taken as 100% by weight.

Comparative Example 5

A $LiNi_{0.8}Co_{0.15}Al_{0.05}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of Comparative Example 5, based on the total weight of the non-aqueous electrolyte taken as 100% by weight.

The Embodiments 16-24 and the $LiNi_{0.8}Co_{0.15}Al_{0.05}O_2$/artificial graphite batteries (charge and discharge voltage range: 3~4.4V) of Comparative Examples 1-3 of the present invention were tested for performance, and the test parameter and test methods are as follows:

(1) High-temperature cycle performance is demonstrated by testing the capacity retention rate after 300th cycles at 1 C rate, 45° C. The specific method is as follows: at 45° C., the formed battery was charged with 1 C constant current/constant voltage to an operating voltage, the cutoff current was 0.01 C, and then discharged to 3.0V with 1 C constant current. After such charging/discharging for 300 cycles, the capacity retention after the 300th cycle was calculated to evaluate its high-temperature cycle performance.

The calculation formula of the 300th cycle capacity retention rate at 45° C. 1 C is as follows:

The 300*th* cycle capacity retention rate (%)=(the 300*th* cycle discharge capacity/the first cycle discharge capacity)*100%;

(3) Test method for capacity retention rate, capacity recovery rate and thickness expansion rate after 14 days of storage at 60° C.: the formed battery was charged to an operating voltage at room temperature with 1 C constant current/constant voltage, the cutoff current was 0.01 C, then discharged to 3.0V with 1 C constant current, the initial discharge capacity of the battery was measured, then charged to the operating voltage with 1 C constant current/constant voltage, the cutoff current was 0.01 C, and the initial thickness of the battery was measured. Then the battery was stored at 60° C. for 14 days, measured the thickness of the battery, discharged it to 3.0V with 1 C constant current, measured the capacity retention of the battery, then charged it to the operating voltage with 1 C constant current/constant voltage, the cutoff current was 0.01 C, then discharged it to 3.0V with 1 C constant current, then measured the recovery capacity. The calculation formulas for capacity retention rate and capacity recovery rate are as follows:

Battery capacity retention rate (%)=(retention capacity/initial capacity)*100%;

Battery capacity recovery rate (%)=(recovery capacity/initial capacity)*100%;

Battery thickness expansion rate (%)=(thickness after 14 days−initial thickness)/initial thickness*100%.

(3) The low-temperature discharge performance is demonstrated by testing the discharge efficiency at −20° C./0.5 C. The specific method is as follows: at 25° C., the formed battery was charged to 4.2V with 1 C constant current/constant voltage, the cutoff current was 0.01 C, then discharged to 2.5V with 1 C constant current, the discharge capacity was recorded. Then charged to 4.2V with 1 C constant current/constant voltage, the cutoff current was 0.01 C, after that, the battery was placed in an environment at −20° C. for 12 hours, then discharged to 2.5V with 0.5 C constant current, and the discharge capacity was recorded.

The calculation formula of discharge efficiency at −20° C./0.5 C is as follows:

Low-temperature of −20° C. discharge efficiency (%)=discharge capacity (−20° C./0.5 C)/discharge capacity (25° C./1 C).

The test results of Embodiments 16-24 and Comparative Examples 4-5 are shown in Table 2 below.

As is well known to those skilled in the art, the Embodiments and Comparative Examples in Table 1 and Table 2 above include conventional solvents, lithium salts and other substances in addition to the listed substances, which are not specifically described in the present application, and, in the electrolyte, the weight other than the listed above is the content of solvent and lithium salt.

Referring to Table 1, Embodiments 16-20, 23 and Comparative Example 4 are compared. Both compound A and compound B were added to the lithium ion non-aqueous electrolyte of Embodiments 16-20 and 23, and only Compound A was added to the lithium ion non-aqueous electrolyte of Comparative Example 4. The results show that compared with the Comparative Example 1 containing only compound A, the cycle performance and high-temperature storage performance of the battery made with the lithium ion non-aqueous electrolyte containing both compound A and compound B are obviously improved. It can be seen that the combined use of compound A and compound B can improve the cycle performance and high-temperature storage performance of the battery.

Comparing Embodiment 23 and Comparative Example 5. Compound A, compound B and other additive (VC) were added to the lithium ion non-aqueous electrolyte of Embodiments 23, and in Comparative Example 5, in addition to Compound A, VC was added. The results show that the combined use of compound A and other additive did not improve the cycle performance and high-temperature storage performance of the battery, instead, the cycle performance and high-temperature storage performance of the battery were reduced. While in the embodiments of the invention, the combined use of compound A, compound B and other additive (VC) did not have influence on the cycle performance and high-temperature storage performance of the battery. It can be seen that the addition of the compound B can also improve the influence of the other additive on the battery cycle performance and high-temperature storage performance.

The above descriptions are only preferred embodiments and are not intended to limit the present invention. Any modifications, equivalent substitutions and improvements made within the spirit and principles of the present invention shall be included within the scope of protection of the present invention.

TABLE 2

| | Compound A | Compound B | Other | The 300th cycle capacity retention rate (%) at 45° C. 1 C | After 14 days of storage at 60° C. Capacity retention rate (%) | After 14 days of storage at 60° C. Capacity retention (%) | After 14 days of storage at 60° C. Thickness expansion rate (%) | Discharged at −20° C. 0.5 C Capacity retention rate (%) |
|---|---|---|---|---|---|---|---|---|
| Embodiment 16 | Compound 10: 2% | Compound 1: 1% | / | 80.2 | 93.43 | 96.36 | 9.14 | 77.56 |
| Embodiment 17 | Compound 10: 0.5% | Compound 1: 1% | / | 74.1 | 88.29 | 90.64 | 15.43 | 69.75 |
| Embodiment 18 | Compound 10: 1% | Compound 1: 1% | / | 78.2 | 90.34 | 93.48 | 13.25 | 71.86 |
| Embodiment 19 | Compound 10: 2% | Compound 1: 0.5% | / | 74.5 | 85.94 | 88.26 | 14.98 | 73.86 |
| Embodiment 20 | Compound 10: 2% | Compound 1: 1.5% | / | 78 | 88.72 | 90.68 | 14.08 | 77.97 |
| Embodiment 21 | Compound 10: 1% | Compound 1: 1% | / | 75.8 | 85.46 | 88.67 | 14.69 | 72.97 |
| Embodiment 22 | Compound 10: 1% | Compound 1: 1% | / | 73.2 | 80.59 | 85.64 | 16.78 | 72.18 |
| Embodiment 23 | Compound 10: 2% | Compound 1: 1% | VC | 80.5 | 93.01 | 95.06 | 9.87 | 77.49 |
| Embodiment 24 | Compound 10: 2% | Compound 3: 1% | / | 79.6 | 92.04 | 94.5 | 9.64 | 74.3 |
| Comparative Example 4 | Compound 10: 2% | / | / | 70.4 | 79.61 | 85.48 | 16.05 | 50.34 |
| Comparative Example 5 | Compound 10: 2% | / | VC: 1% | 69.7 | 78.9 | 83.52 | 15.92 | 62.36 |

What is claimed is:

1. A non-aqueous electrolyte for lithium ion battery, comprising a compound A represented by formula I and a compound B represented by formula II, Formula I

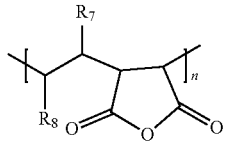

Formula II

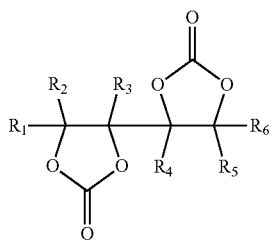

in formula I, $R_7$ and $R_8$ are independently selected from one of hydrogen atom, halogen atom, —O—$R_9$ or aryl, wherein n is a positive integer and $R_9$ is a C1-C4 alkyl group;

in formula II, $R_1$, $R_2$, $R_3$, $R_4$, $R_5$ and $R_6$ are each independently selected from one of hydrogen atom, fluorine atom and C1-C5 group; the C1-C5 group is selected from a hydrocarbon group, trifluoromethyl group, oxygen-containing hydrocarbon group, silicon-containing hydrocarbon group, and cyano-substituted hydrocarbon group; and the percentage mass content of the compound B is 0.5-5% based on the total mass of the non-aqueous electrolyte for lithium ion battery being 100%.

2. The non-aqueous electrolyte for lithium ion battery of claim 1, wherein the compound B comprises one or more of compounds 1-9 represented by the following structural formulae, Compound 1

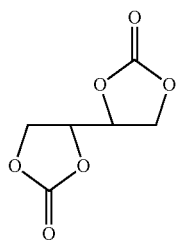

Compound 2

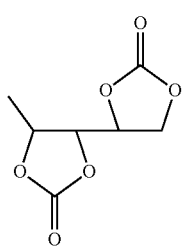

Compound 3

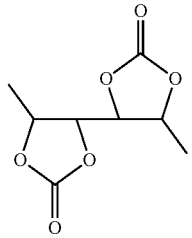

Compound 4

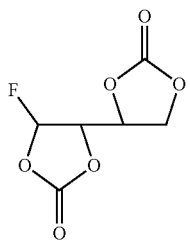

Compound 5

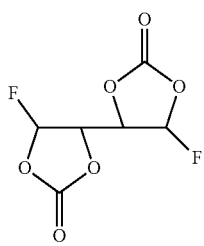

Compound 6

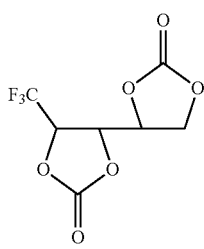

Compound 7

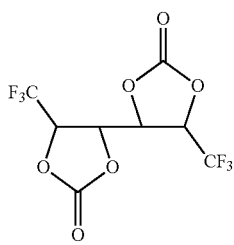

Compound 8

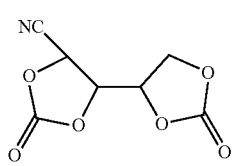

Compound 9

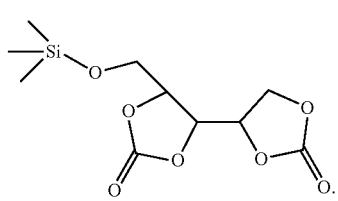

3. The non-aqueous electrolyte for lithium ion battery of claim 1, wherein the compound A comprises one or more of compounds 10-13 represented by the following structural formulae,

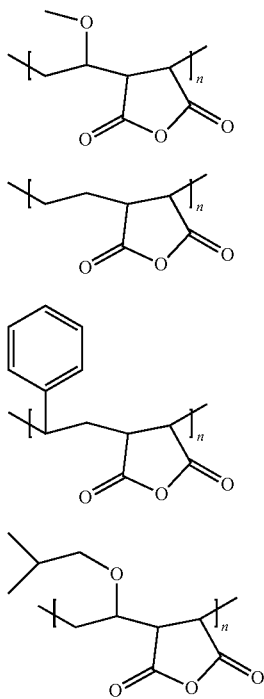

Compound 10

Compound 11

Compound 12

Compound 13 in the compounds 10, 11, 12 and 13, n is a positive integer.

4. The non-aqueous electrolyte for lithium ion battery of claim 1, wherein the percentage mass content of the compound A is 0.1-5% based on the total mass of the non-aqueous electrolyte for lithium ion battery being 100%.

5. The non-aqueous electrolyte for lithium ion battery of claim 1, wherein the lithium ion non-aqueous electrolyte further comprises at least one of unsaturated cyclic carbonate compounds, fluorine-substituted cyclic carbonate compounds, and sultone compounds.

6. The non-aqueous electrolyte for lithium ion battery of claim 5, wherein the unsaturated cyclic carbonate compound includes at least one of vinylene carbonate and vinyl ethylene carbonate; the fluorine-substituted cyclic carbonate compound includes fluoroethylene carbonate; the sultone compound is selected from at least one of 1,3-propane sultone, 1,4-butane sultone, and 1,3-propene sultone.

7. The non-aqueous electrolyte for lithium ion battery of claim 1, wherein the non-aqueous electrolyte for lithium ion battery comprises a lithium salt selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$ and $LiN(SO_2F)_2$.

8. A lithium ion battery, comprising a positive electrode, a negative electrode, a separator interposed between the positive electrode and the negative electrode, and an electrolyte, wherein the electrolyte is the non-aqueous electrolyte for lithium ion battery of claim 1.

9. The lithium ion battery of claim 8, wherein the positive electrode comprises a positive electrode active material, and the positive electrode active material is at least one of $LiNi_xCo_yMn_zL_{(1-x-y-z)}O_2$, $LiCo_xL_{(1-x')}O_2$, $LiNi_{x''}L'_{y'}Mn_{(2-x''-y')}O_4$ and $Li_zMPO_4$, wherein, L is at least one of Al, Sr, Mg, Ti, Ca, Zr, Zn, Si or Fe, $0 \leq x \leq 1$, $0 \leq y \leq 1$, $0 \leq z \leq 1$, $0 < x+y+z \leq 1$, $0 < x' \leq 1$, $0.3 \leq x'' \leq 0.6$, $0.01 \leq y' \leq 0.2$, L' is at least one of Co, Al, Sr, Mg, Ti, Ca, Zr, Zn, Si and Fe; $0.5 \leq z' \leq 1$, M is at least one of Fe, Mn and Co.

* * * * *